Dec. 2, 1958     H. H. VON DER HELLEN     2,862,309
SYMBOL CORRESPONDING DEVICE FOR CHILDREN
Filed May 18, 1956
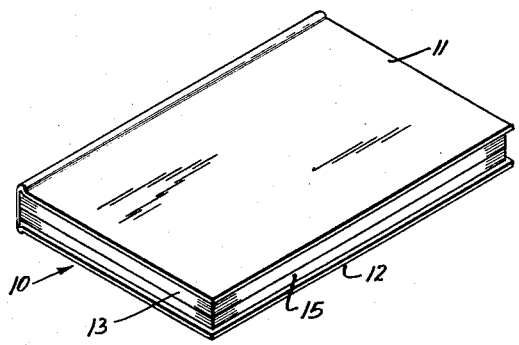
FIG. 1
FIG. 2
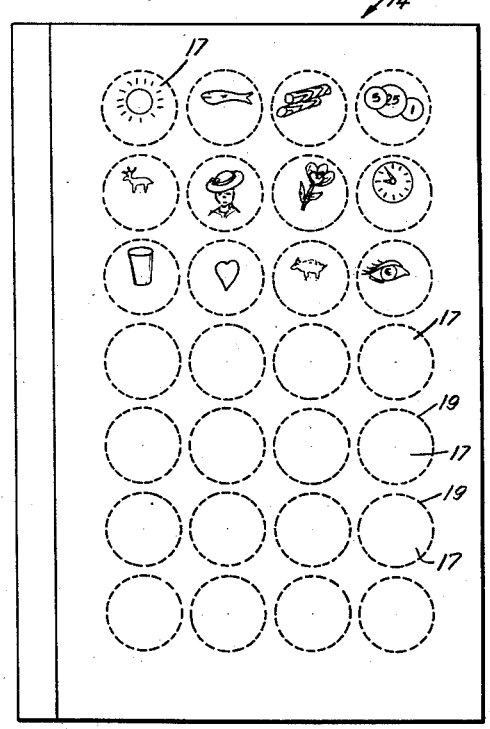
FIG. 3
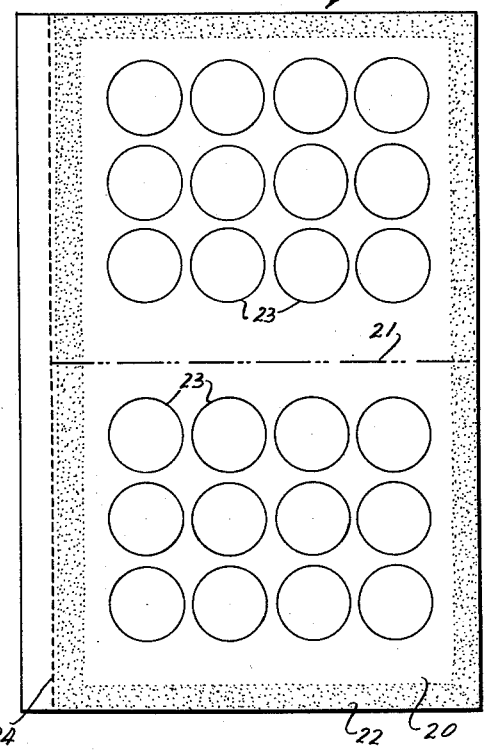
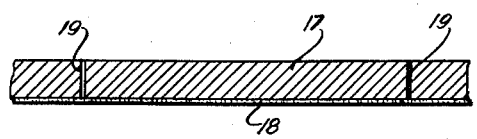
FIG. 4
INVENTOR.
HAROLD H. VON DER HELLEN
BY
ATTORNEY

# United States Patent Office 2,862,309
Patented Dec. 2, 1958

2,862,309

SYMBOL CORRESPONDING DEVICE FOR CHILDREN

Harold H. von der Hellen, Anaheim, Calif.

Application May 18, 1956, Serial No. 585,903

4 Claims. (Cl. 35—35)

This invention relates generally to educational devices and particularly pertains to a device for facilitating correspondence by children too young to be able to recognize or write letters and words, but capable of identifying objects by name and sound.

Small children are wont to imitate grownups, and this desire to imitate particularly concerns letter writing. Thus it is common knowledge that a child unable to read or write often expresses the wish to "write a letter" to someone. The present invention is intended to enable a child to do just that.

A fundamental thought to provide means to enable a child to correspond with others by letter is the provision of pictorial representation or symbols of objects readily identifiable by the child by name and sound, and which identification of objects by name or sound is intended to substantially correspond or to be sound-similar to words or meanings a child wishes to express in "composing" a letter, although the thus expressed identifications by the child entirely differentiates from the actual name of such objects, and wherein means are provided to facilitate "composition" of a letter by the child.

More specifically this invention involves the provision of a sheet with push-outs bearing representations of different objects or symbols, for instance, animals, people, flowers, tools, household articles, etc., for identification by the child of such objects by name and sound and which identification by name and sound may substantially correspond or be sound-similar to words of an entirely different meaning from those illustrated on the push-outs. Thus, for instance, the representation of the sun may be readily associated in the child's mind with the word "son," or the representation of a deer may readily be used by the child as the word "dear," or the representation of a ewe may serve the child for the word "you." These push-outs are preferably provided with an adhesive coating at their back to facilitate their attachment.

In addition to the sheet of push-outs there would be a sheet in the form of a mailable unit which can be folded and sealed along its marginal edges, and which unit has within its margins a plurality of locating markings for placing and attaching such push-outs, said locating markings substantially corresponding in shape and size to that of the push-outs of the first-described sheet. Thus a child would remove the push-outs from the push-out sheet and place it onto the location markings of the mailable unit, then fold the unit and seal it and either deliver it in person or have the elder provide the unit with the desired address to which the "letter" by the child is directed.

The prime object of this invention is the provision of an educational and amusing device for small children unable to read or write, but capable of identifying objects by name and sound, and which device is to facilitate providing means for enabling a child to "correspond" with others.

Another object of this invention is the provision of two sets of sheets, one set of sheets being provided with a plurality of bodily spaced push-outs having at one face thereof representations of objects or symbols, whereas at the other face or back of the push-outs is provided adhesive matter for the attachment of the push-outs, the other set of sheets being in the form of foldable and mailable units having adhesive margins and location markings within these margins, spaced and shaped corresponding to the spacing and shape of the push-outs, and over which spaced location markings the push-outs removed from the first-mentioned sheets can be attached, whereupon the mailable units can be folded and sealed.

Still another object of this invention is the provision of a book-like structure composed of two sheet sections, one sheet section having a plurality of bodily spaced adhesive push-outs bearing at their top faces pictorial representations of objects, whereas the other sheet section comprises detachable units which are foldable and have adhesive margins, and wherein within the margins are provided spaced location markings for the reception of push-outs from the sheets of the first section.

The foregoing and other objects of the present invention will become more fully apparent from the ensuing description in conjunction with the accompanying drawings, wherein:

Fig. 1 is a perspective representation of a book in accordance with the present invention;

Fig. 2 is a plan view of one of the book sheet provided with push-outs;

Fig. 3 is a plan view of another book sheet representing a mailable unit with location markings for the push-outs; and Fig. 4 is an enlarged partial cross section through one of the push-outs.

Book 10, illustrated in Fig. 1, is composed of top cover 11 and bottom cover 12 and between these covers there is shown an upper section 13 representing a plurality of superimposed sheets such as illustrated in Fig. 2 at 14, whereas the lower section 15 represents a plurality of sheets as detailed in Fig. 3 at 16. Sheet 14 is provided with a plurality of uniformly spaced and uniformly sized push-outs 17 equipped at their top faces with representations or symbols of different objects, while the back of the push-outs have an adhesive coating 18, as clearly seen in Fig. 4. These push-outs are partly separated from the body of sheet 14 by perforations 19 facilitating the bodily removal of these push-outs from the sheet, while leaving intact the rest of the sheet body.

In the top row of the push-outs from left to right will be seen representations of the sun, a fish, wood and money. In the next row the push-outs bear the representation of a deer, a woman's head, a poppy flower and the representation of a clock dial. In the third row is shown a tumbler, a heart, the representation of a ewe and of an eye. These pictorial illustrations of objects or symbols on the push-outs are intended to be identified by the child by name, and the sound of such name may either actually identify an object or can substantially correspond or be similar to words of an entirely different meaning. Thus, for instance, the sun is sound-similar to the word "son," wood is sound-similar to "would," deer is sound-similar to "dear," the representation of the woman's head would identify "Mommy" and the representation of the poppy flower would identify the word "Poppy." The tumbler in the third row would identify "glass," the heart shape in that row would identify the word "hard," the identification of a ewe would stand for "you," and the eye would represent the letter "I."

In Fig. 3 the sheet 16 constitutes a mailable unit with a central area 20 having an indicated folding line 21, the peripheral margin of the unit being provided with adhesive matter 22. Within the margin are location markings 23 substantially corresponding in size and spacing to that of push-outs 17. Along the left or interior gummed margin of sheet 16 there are provided perforations 24 for facilitating the individual removal of each mailable unit 16 from lower section 15 of book 10.

When a child desires to "compose" a letter, for instance to its father, it would remove the representation of the deer, paste it on over the lefthand upper location marking in the first row of sheet 16, whereupon it would remove the push-out with the poppy flower and place it over the second location marking. Over the other location markings are applied representations of objects corresponding to the meanings the child wishes to express, and to the two last markings can be applied the representations of a ewe and, for instance, the picture of the sun. When the child has finished the removal of the desired push-outs and their transfer and attachment to the various location markings on sheet 16, the finished "letter" can be removed by tearing it off along perforations 24, whereupon it is folded and sealed. Thus the child is enabled to compose a "letter and either mail it or hand it to the person to whom the letter is to be directed.

While the principle of the present invention has been described in the foregoing in conjunction with specific forms illustrated, it is quite obvious that this invention may be practiced by other means than those shown and described and it is to be understood that the employment of such other means shall reside within the scope of this invention without departing from the principle thereof, as defined in the annexed claims.

What is claimed as new is:

1. In an educational correspondence device for children unable to read or write but capable of identifying objects by name and sound, the combination of two sheets, one sheet having a plurality of bodily spaced, uniformly sized push-outs bearing representations of various objects or symbols, the backs of these push-outs being provided with adhesive matter for their attachment, the push-outs being bodily removable from that one sheet, while leaving intact the rest of the sheet body; the other sheet being in the form of a foldable and mailable unit having peripheral adhesive margins and spaced push-out location markings within the margins corresponding in size and spacing to that of the push-outs of that one sheet to facilitate attachment over these markings of push-outs removed from that one sheet.

2. In an educational correspondence device according to claim 1, and wherein sets of the one and of the other sheet are bound in book form and wherein the units of that other sheet are provided with perforations along one of their peripheral adhesive margins to facilitate their individual removal from the book form.

3. In an educational correspondence device according to claim 2, and wherein the object representations or symbols on the push-outs are illustrations of objects identifiable by a child by name and sound, and wherein such name and sound identification of an object by the child substantially corresponds or is sound-similar to the identification of an entirely different object from that illustrated on a push-out.

4. In a device for facilitating correspondence by a child unable to read but capable of identifying objects by name, a book composed of two sheet sections, one section containing sheets provided with bodily spaced and bodily removable push-outs bearing representations of objects or symbols at one of their faces and having adhesive matter at their other faces or backs; the other sheet section being composed of detachable, foldable and mailable units having joinable margins provided with adhesive and having spaced location markings within their margins for push-outs removed from that one sheet section and transferred and attached to units of that other section, said location markings corresponding substantially to the location and size of the push-outs on the sheets of that one section, said mailable units of the other sheet section having perforations along their interior adhesive-provided margins to facilitate their individual removal.

References Cited in the file of this patent
UNITED STATES PATENTS

| 1,131,494 | Earle | Mar. 9, 1915 |
| 1,217,632 | Pritchard | Feb. 27, 1917 |
| 1,225,071 | Spotswood | May 8, 1917 |
| 1,379,871 | McGuire | May 31, 1921 |
| 2,361,154 | Schoolfield | Oct. 24, 1944 |